(12) United States Patent
Manzur et al.

(10) Patent No.: US 12,372,616 B1
(45) Date of Patent: Jul. 29, 2025

(54) NEAR-IR EMULATOR FOR COMPLEX ELECTROMAGNETIC STRUCTURES

(71) Applicant: The United States of America as represented by the Secretary of the Navy, Newport, RI (US)

(72) Inventors: Tariq Manzur, Lincoln, RI (US); Yifei Li, East Walpole, MA (US)

(73) Assignee: The United States of America as represented by the Secretary of the Navy

( * ) Notice: Subject to any disclaimer, the term of this patent is extended or adjusted under 35 U.S.C. 154(b) by 340 days.

(21) Appl. No.: 17/870,903

(22) Filed: Jul. 22, 2022

(51) Int. Cl.
*G01S 7/41* (2006.01)
*G01S 7/282* (2006.01)
*G01S 13/524* (2006.01)
*G01S 13/90* (2006.01)

(52) U.S. Cl.
CPC .............. *G01S 7/415* (2013.01); *G01S 7/282* (2013.01); *G01S 13/524* (2013.01); *G01S 13/9021* (2019.05); *G01S 13/9064* (2019.05)

(58) Field of Classification Search
CPC .. G01S 7/415; G01S 13/9064; G01S 13/9021; G01S 7/282; G01S 13/524
USPC ........................................................ 342/28
See application file for complete search history.

(56) References Cited

U.S. PATENT DOCUMENTS

| | | | | |
|---|---|---|---|---|
| 4,829,172 A | * | 5/1989 | Miller ................... | G01S 7/4812 |
| | | | | 250/205 |
| 6,529,157 B1 | * | 3/2003 | Mensa ..................... | G01S 7/412 |
| | | | | 342/174 |
| 2011/0085154 A1 | * | 4/2011 | Schwanke .......... | H04N 1/02865 |
| | | | | 250/227.21 |
| 2012/0274937 A1 | * | 11/2012 | Hays ....................... | G01S 17/95 |
| | | | | 356/450 |
| 2014/0078489 A1 | * | 3/2014 | Hoashi .................... | G01S 7/499 |
| | | | | 356/4.01 |
| 2019/0353789 A1 | * | 11/2019 | Boloorian ............... | G01S 17/42 |
| 2019/0391408 A1 | * | 12/2019 | Mansharof ......... | G02B 27/0172 |
| 2021/0103049 A1 | * | 4/2021 | Blanche ............... | G01S 13/003 |

OTHER PUBLICATIONS

Iwaszczuk et al. "Terahertz Radar Cross Section Measurements," DTU Library, Optics Express, 18(25), pp. 26399-26408. https://doi.org/10.1364/OE.18.026399 (Year: 2010).*

* cited by examiner

*Primary Examiner* — Bernarr E Gregory
*Assistant Examiner* — Samarina Makhdoom
(74) *Attorney, Agent, or Firm* — James M. Kasischke; Jeffry C. Severson (57) ABSTRACT

A device for measuring electromagnetic properties of a target includes a stage capable of holding, rotating, and translating the target. A mirror is provided that can be laterally translated. A light source provides a light signal that a splitter splits onto a reference path and a target path. The light signal on the target path is collimated and shines on the target, and the light signal on the mirror path is collimated and shines on the mirror. Reflected light from the target and the mirror is provided to an optical coupler. The optical coupler combines the light and provides output a signal processor. The signal processor computes electromagnetic properties of the target from the combined optical signal.

19 Claims, 5 Drawing Sheets

NEAR-IR EMULATOR FOR COMPLEX ELECTROMAGNETIC STRUCTURES

STATEMENT OF GOVERNMENT INTEREST

The invention described herein was made in the performance of official duties by employees of the U.S. Department of the Navy and may be manufactured, used, or licensed by or for the Government of the United States for any governmental purpose without payment of any royalties thereon.

CROSS-REFERENCE TO RELATED APPLICATIONS

The present application claims the benefit of the U.S. Provisional Application Ser. No. 63/299,153 filed on Aug. 4, 2021 entitled "Coherent Near-IR Emulator for Complex EM Structure" by the inventors Tariq Manzur and Yifei Li, the complete disclosure of which is incorporated herein by reference it its entirety.

BACKGROUND OF THE INVENTION

1) Field of the Invention

The present invention is directed to a test device using near-IR light for emulating the radar cross-section of electromagnetic structures.

2) Description of the Related Art

Radar cross-section (RCS) is a measure of how detectable an object is by radar. It is a fundamental property of any electromagnetic structure, including missiles, autonomous vehicles, ground vehicles, airplanes, naval vessels, cargo ships etc. For stealth operation, a small RCS signature is critical. RCS is integral to the development of radar stealth technology, particularly in applications involving aircraft, ballistic missiles, ships, and other platforms.

Radar cross-section (RCS) and related inverse synthetic aperture radar image (ISAR) are important signatures that are used for electromagnetic navigation and observation of vehicles, planes, and cargo ships. Usually, RCS and ISAR are measured in anechoic chambers. It is often time-consuming to fabricate electromagnetic models and perform measurements. Furthermore, for very large structures, such as submarines, this is impractical due to the sheer size of the structure.

Previously, scaled RCS/ISAR measurements have been investigated at frequencies in the terahertz (THz) range. (Terahertz radiation—also known as submillimeter radiation—uses frequencies at one trillion (1012) Hertz.) However, for this approach, there are significant challenges in providing a THz signal source, detection of the THz signal, and the construction of scaled electromagnetic structures with desired electromagnetic properties at the THz frequency range. Similar to THz waves, near infrared (NIR) light can be used for scaled RCS measurements by reducing the size by a factor of $10^5$. Near-IR (NIR) has a wavelength of 0.7-3.0 micrometers and a frequency of 100-400 THz. NIR radiation is easier to generate, manipulate, and detect.

There is a need for a test device that can emulate RCS measurements of complex structures.

SUMMARY OF THE INVENTION

It is a first object of the present invention to provide a system for measuring radar cross-section and inverse synthetic aperture radar image.

Another object is to provide a system that does not require an anechoic chamber.

Yet another object is to provide a method for rapidly determining RCS and ISAR based on optical scattering cross-section (OSSC) measurement and Doppler scattering imaging.

Accordingly, a device for measuring electromagnetic properties of a target is provided. The device includes a stage capable of holding, rotating, and translating the target. A mirror is provided that can be laterally translated. A light source provides a light signal that a splitter splits onto a reference path and a target path. The light signal on the target path is collimated and shines on the target, and the light signal on the mirror path is collimated and shines on the mirror. Reflected light from the target and the mirror is provided to an optical coupler. The optical coupler combines the light and provides output a signal processor. The signal processor computes electromagnetic properties of the target from the combined optical signal.

According to another embodiment, an apparatus for emulating radar cross-section measurement of an electromagnetic structure includes utilizing a model of the electromagnetic structure. The model is provided on a rotational stage. A mirror is provided that can be laterally translated. An optical noise source is joined to an optical splitter to split light onto a model path and a reference path. Light on the model path is provided as input to a first circulator and provided to a first collimator lens. Light from the first collimator lens shines on the model and is reflected back through the lens to the first circulator. Light on the reference path is provided through a second circulator to a second collimator lens. Light collimated by the second collimator lens shines on the mirror and is reflected back through the lens to the second circulator. Outputs from the first and second circulators are received at an optical coupler. The output of the optical coupler is converted into an electrical signal and provided to a signal processor. The signal processor can determine an electromagnetic structure radar cross-section from the combined optical signal.

A method is provided for emulating a radar cross-section measurement of an electromagnetic structure. A model of the electromagnetic structure is created that is scaled to the differences between radar frequency and light frequency. The model is provided on a rotational stage. A light source is provided and divided onto two paths, a model path and a reference path. The light on the model path is collimated and shined on the model while the model rotates. The light on the reference path is collimated and shined on a mirror. Reflected light is received on each path such that both paths have the same path length. The received light from the paths is combined into 90-degree phase separated optical signals. The phase separated optical signals are converted into electrical signals. The electrical signals can be processed to give an emulated radar cross-section measurement of the electromagnetic structure.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

The invention described herein is a test device for emulating radar cross-section measurement of an electromagnetic structure using near infrared (near-IR) light. For the purposes herein, near-IR is light having wavelength between 0.75 μm and 1.5 μm.

Figure 1:
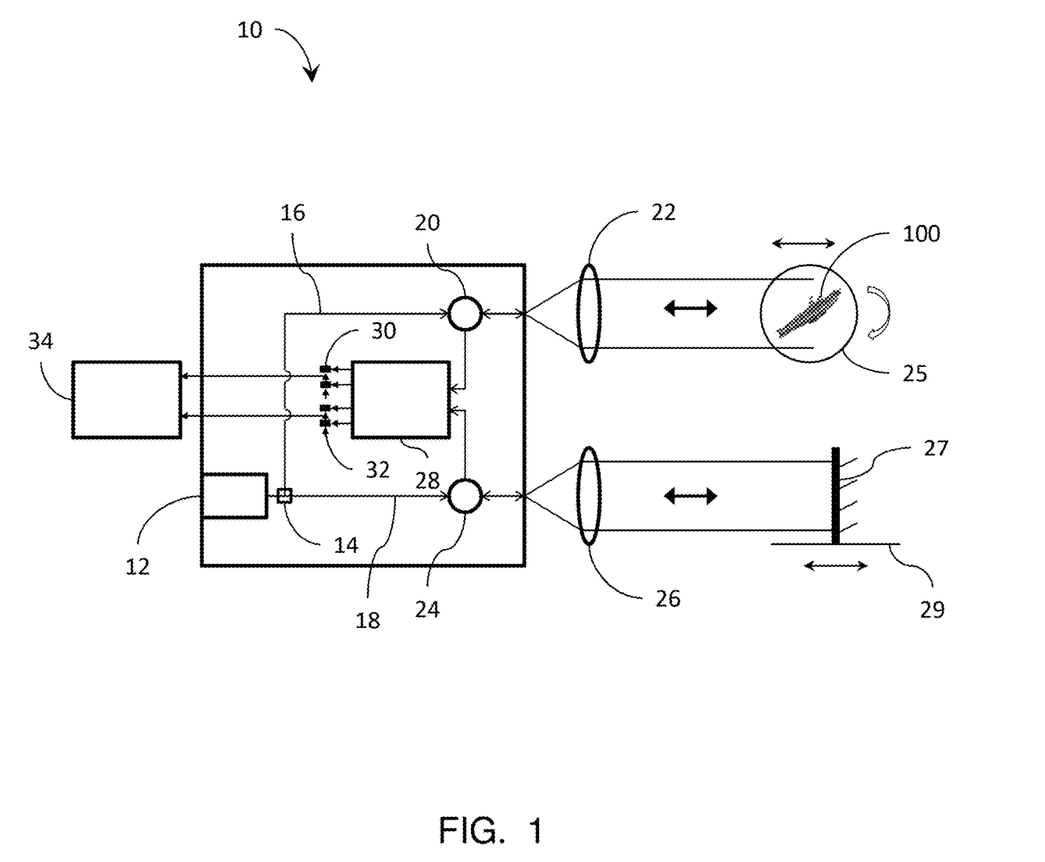
FIG. 1 provides a diagram of a measurement device according to a first embodiment.

Referring to the drawings, FIG. 1 shows a test device having a light transceiver, indicated generally as 10. The light transceiver 10 includes an optical noise signal source 12. An optical noise signal is launched by the optical noise signal source 12. The optical noise signal should have short coherence length to allow depth resolution as described further below. In other words, the optical noise signal should have a frequency in the near-IR frequency range. An optical power splitter 14 is joined to the optical noise signal source 12. The optical power splitter 14 has outputs capable of dividing the optical noise signal into a target light path 16 and a reference light path 18.

In the target light path 16, the optical noise signal enters a first optical circulator device 20 at a first input. The first optical circulator device 20 routes the signal in the target light path 16 to a first collimator lens 22, sometimes referred to as the target collimator lens, using a first input-output. In the reference light path 18, the optical noise signal enters a second optical circulator device 24 at a second input. The second optical circulator device 24 routes the signal in the reference light path 18 to the second collimator lens 26, sometimes referred to as the reference collimator lens, using a second input-output. The collimator lenses 22, 26 prevent light spreading in free space.

An object to be measured, such as target 100, is positioned on a rotational stage 25 that is rotating while the collimated optical noise signal is provided. In some embodiments, the rotational stage 25 is provided with adjustable yaw to simulate an object in the ocean or otherwise at an angle to the observer.

The collimated optical noise signal in the target light path 16 shines on the target 100 on the rotational stage 25 while the rotational stage is rotating. This causes a Doppler shift in frequency in the reflections from the target 100. A target reflected signal from the target 100 passes through the first collimator lens 22 and is focused back to the first optical circulator device 20 through the first input-output. The first optical circulator device 20 routes the target reflected signal from a first output to a target input of an optical coupler 28. In some embodiments, the optical coupler 28 may be a 90-degree optical hybrid coupler.

The collimated optical noise signal in the reference light path 18 shines on a reference mirror 27 on a translational stage 29. The reference mirror 27 and the translational stage 29 are laterally positionable to obtain the same optical path length in the reference light path 18 as that which will be analyzed in the target light path 16. For full measurement, data can be collected by positioning the translational stage 29 at different ranges to match the range to the nearest portion of the target 100 up to the range to the farthest portion of the target 100. A reference reflected signal from the reference mirror 27 passes through the second collimator lens 26 and is focused back to the second optical circulator device 24 through the second input-output. The second optical circulator device 24 routes the reference reflected signal from a second output to a reference input of the optical coupler 28. Signals of interest from the first optical circulator device 20 and the second optical circulator device 24 arrive at the optical coupler 28 at the same time.

The optical coupler 28, having a target input and a reference input, is joined to receive the reference reflected signal from the second output of the second optical circulator device 24 and the target reflected signal from the first output of the first optical circulator device 20. The optical coupler 28 combines the reference reflected signal with the target reflected signal and decomposes the combined optical signal into 90-degree phase separated signals with one signal being identified as the in-phase signal and the other being identified as the quadrature phase signal. Output ports of the optical coupler 28 provide in-phase (I) output and quadrature phase (Q) output. The I-phase optical output is received by first photodetectors 30 and converted to an I-phase electrical output signal. The Q-phase optical output is received by second photodetectors 32 and converted to a Q-phase electrical output signal. I-phase and Q-phase electrical output signals are provided to a signal processor 34, such as a digital signal processor. I-phase and Q-phase output can be used to determine the radar cross-section of the target 100 at any orientation, as described below.

Figure 2:
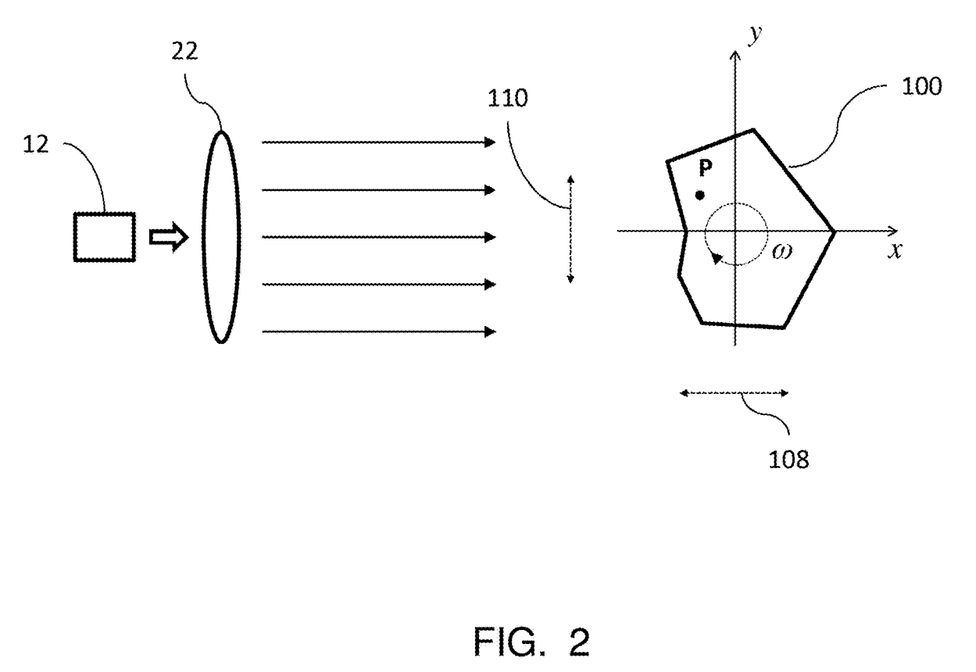
FIG. 2 is a diagram of geometry and coordinates for measurement.

Similar to THz waves, near infrared (NIR) light can also be used for scaled RCS measurements by reducing the size by a factor of $10^5$. The NIR radiation is easier to generate, manipulate, and detect. Using wideband optical noise and coherent optical processing, the light transceiver 10 can perform simultaneous cross-range/down-range RCS/ISAR, as illustrated in FIG. 2. The optical noise signal source 12 provides white noise light in the NIR band. (White noise refers to a random signal having a constant power spectral density.) This can be expressed as:

$$E(t) = X_I(t)\cos(\omega_o t) + X_Q(t)\sin(\omega_o t) \quad (1)$$

where $X_I$ and $X_Q$ are in-phase and quad-phase noise amplitudes of the optical field, and $\omega_o$ is the center frequency of the provided light.

In one test, a 193 THz optical signal was used having a bandwidth of 2 THz.

Due to the rotation of the target 100, the Doppler frequency shift, $f_d$, of the back scattered signal from location P on the target 100 contains both down-range location information, as indicated by arrow 108, and cross-range location information, as indicated by arrow 110. For example, the location's cross-range information, $y_p$, can be expressed as:

$$f_d = 2y_p \frac{\omega}{\lambda} \quad (2)$$

where $y_p$ is the cross-range coordinate of P,

ω is the rotation frequency, and

λ is the center optical wavelength.

In one test, the rotation frequency @ was 7 Hz and the optical wavelength was 1.55 microns.

Thus, the output of the light transceiver 10, sometimes referred to as the optical I/Q detector, should be:

$$I(t)=2R_{PD}\Gamma_r\Gamma_p[X_I(t-\tau_p)X_I(t-\tau_r)+X_Q(t-\tau_p)X_Q(t-\tau_r)]\cos[f_d \cdot t+\phi_p-\phi_r] \quad (3)$$

$$Q(t)=2R_{PD}\Gamma_r\Gamma_p[X_I(t-\tau_p)X_I(t-\tau_r)+X_Q(t-\tau_p)X_Q(t-\tau_r)]\sin[f_d \cdot t+\phi_p-\phi_r] \quad (4)$$

where $R_{pd}$ is the responsivity of the photodetector,
$\Gamma_p$ is the scattering coefficient at the location P,
$\phi_P$ is the optical phase lag on the target return path,
$\tau_p$ is the target time delay at P,
$\Gamma_r$ is the reflection coefficient of the reference mirror 27,
$\phi_r$ is its optical phase lag on the reference return path, and
$\tau_r$ is the reference time delay.

The responsivity of the photodetectors indicates the ratio between the output photocurrent and input optical power, and it has the unit of A/W. For 1.5-micron light, the responsivity of a commercial photodetector is often ~0.8 A/W. The scattering coefficient, $\Gamma_p$, is the ratio between the incident electromagnetic field magnitude and the scattered electromagnetic field magnitude at location P. It ranges from zero to one. A map of scattering coefficient vs. the space represents the target ISAR image.

Relative to the Doppler shift frequency $f_d$ (~1 KHz range) caused by rotation of the target 100, the optical noise is of much bigger bandwidth (>1000 GHZ). Therefore, the light transceiver 10 should only sense the auto-correction function of the noise magnitude and equations (3) and (4) can be reduced to:

$$I(t)=2R_{PD}\Gamma_r\Gamma_p[R_I(\tau_p-\tau_r)+R_Q(\tau_p-\tau_r)]\cos[f_d \cdot t+\phi_p-\phi_r] \quad (5)$$

$$Q(t)=2R_{PD}\Gamma_r\Gamma_p[R_I(\tau_p-\tau_r)+R_Q(\tau_p-\tau_r)]\sin[f_d \cdot t+\phi_p-\phi_r] \quad (6)$$

Because Maxwell's equations are invariant under dilatation transformation, it is possible to make measurements on reduced size models utilizing proportionally higher frequencies. By conserving the scale factor between model and wavelength, the solution is identical. Several configurations for an I/Q detector with different target configurations were analyzed to verify the scaled RCS/ISAR measurement concept. A 1.55-micron light source was used and models were 3D printed using a scaling of 100,000 to 1. Thus, the measurement corresponds to a full-sized electromagnetic structure and a RF frequency of 1.935 GHz. Note that, to achieve RCS measurement for another RF frequency band, a model with a different scaled factor can be printed.

A commercial 3D printer provides sufficient precision to achieve the 100,000 to 1 scaling. It can realize 10 nm range feature size, which is sufficiently small compared with the 1550 nm wavelength, and thus adequate for the RCS/ISAR measurement.

The captured baseband waveform can be modulated by the auto-correction functions of the optical noise amplitudes. The pulse width of autocorrelation functions is inversely proportional to the bandwidth of the optical noise. With a sufficiently wide optical noise spectrum, the baseband waveform obtained by equations (5) and (6) is non-trivial only when the delay times $\tau_p$ and $\tau_r$ are equal.

Figure 3:
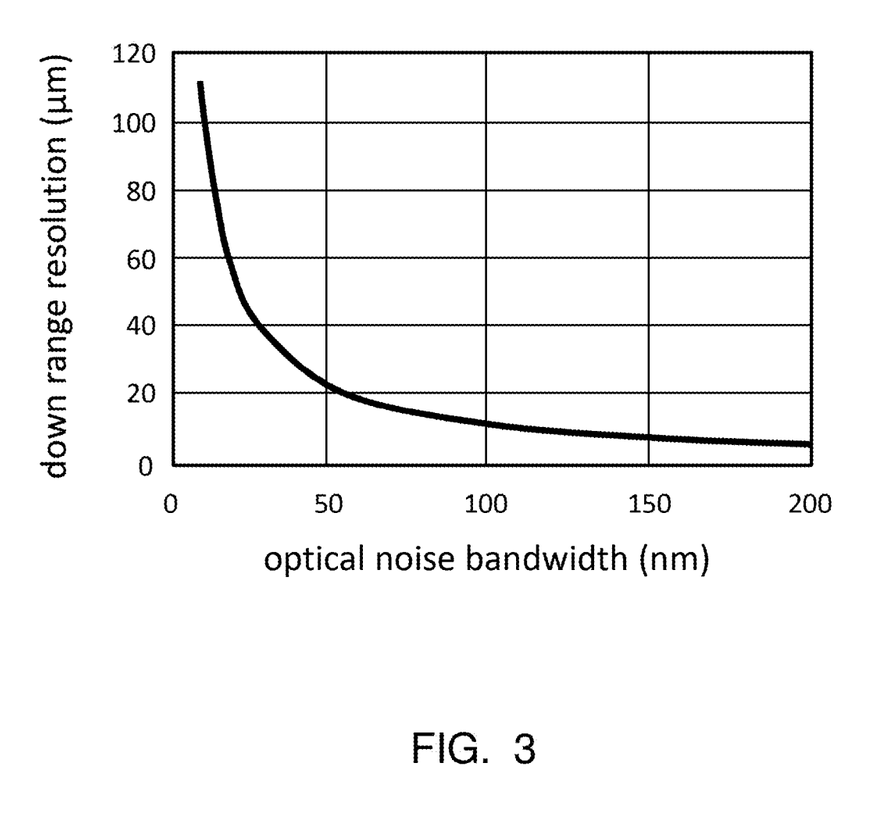
FIG. 3 is a graph of optical noise bandwidth vs. down-range resolution.

Thus, the down-range information ($\tau_p$) is measurable from the delay time ($\tau_r$) of the reference mirror 27, while the cross-range information is extracted through the spectra estimation. The down-range resolution is determined by the bandwidth of the optical noise signal, where ~5-micron down-range resolution is achieved with 200 nm optical bandwidth. FIG. 3 is a graph of optical noise bandwidth vs. down-range resolution, as measured.

Like that of RF frequency RCS measurement range, the target cross-range image is extracted from the spatial dependent Doppler shift due to rotation of the target 100 on the rotational stage 25.

With the down-range measurement determined, the reference and target time delay are identical. Thus, the output from the optical I/Q detector (light transceiver 10) is:

$$I(t)=2R_{PD}\Gamma_r\Gamma_p[R_I(0)+R_Q(0)]\cos[f_d \cdot t+\phi_p-\phi_r] \quad (7)$$

$$Q(t)=2R_{PD}\Gamma_r\Gamma_p[R_I(0)+R_Q(0)]\sin[f_d \cdot t+\phi_p-\phi_r] \quad (8)$$

The magnitude and sign of the Doppler shift term fa can be determined with digital signal processing (i.e., spectra analysis) of both the I(t) and Q(t) baseband signals. The accuracy of the spectra estimation ($\delta f_d$) is determined by the data acquisition time, which is given by:

$$\tau_A = \frac{\alpha}{\delta f_d} \quad (9)$$

where $\alpha$ is a scaling factor, $\alpha \approx 1$.

The desired Doppler shift resolution is related to the cross-range resolution according to equation (2).

The sampling time should be a small fraction of the rotation period:

$$\tau_A = \frac{2\pi}{\omega_s \cdot \beta} \quad (10)$$

where $\omega_s$ is the rotation speed, and
$\beta$ is another scaling factor, which is much greater than 1. In other words, the sampling time should be short with respect to the rotation period. In one test, sampling rate was >20 M samples/second, the scaling factor was $10^5$ and rotation speed was ~7 Hz.

From equation (2), we know that the Doppler frequency measurement accuracy and the cross-range resolution is related by:

$$\delta f_d = 2\delta y_p \frac{\omega}{\lambda} \quad (11)$$

Upon submitting equations (9) and (10) into equation (11), the cross-range resolution of the measurement range can be giving by:

$$\delta y_p = \alpha \cdot \beta \frac{\lambda}{4\pi} \quad (12)$$

Thus, the cross-range resolution is ultimately determined by the wavelength and the scaling factors (a and B). This is exactly the sample limitation in the RF domain RCS/ISAR measurement. Thus, the present invention reproduces an identical (but scaled) cross-range ISR image as that of the original electromagnetic structure in the RF domain.

Figure 4:
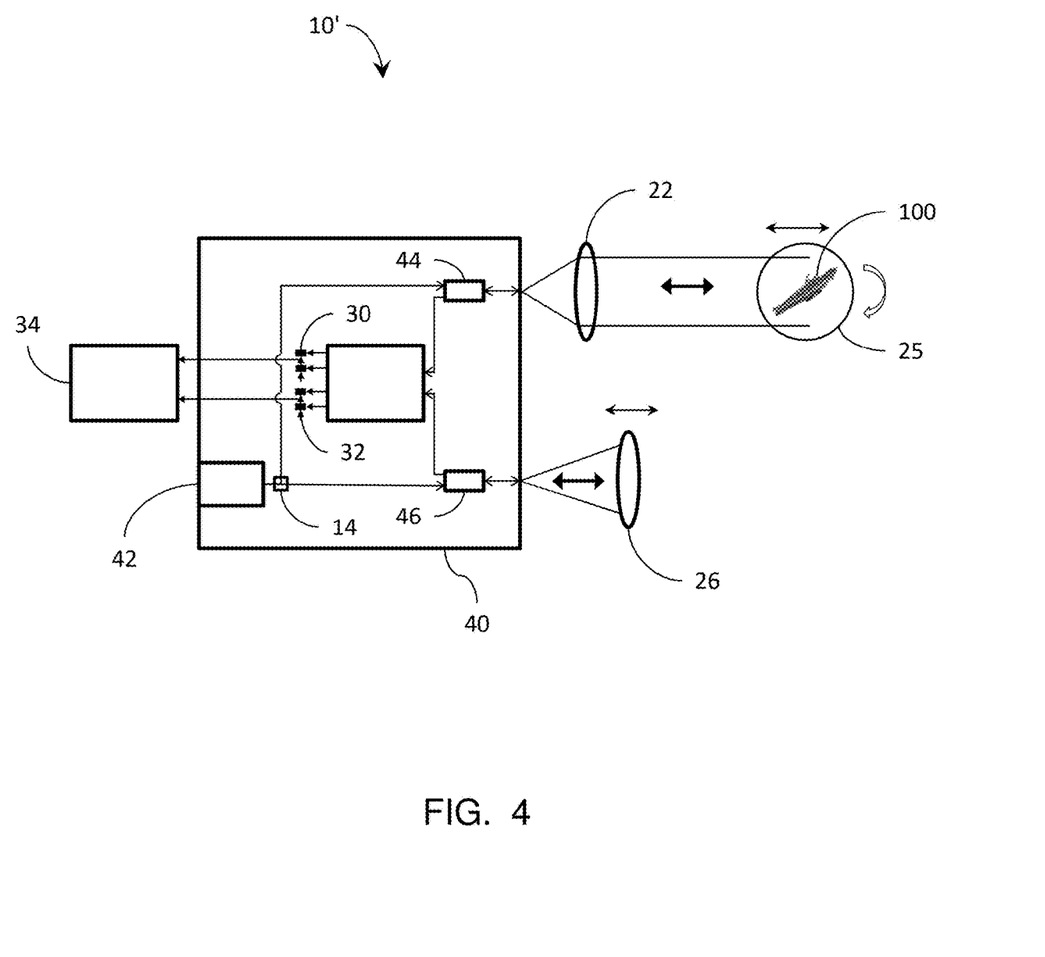
FIG. 4 provides a diagram of a device using a photonic chip.

Referring to FIG. 4, an embodiment of the light transceiver 10' can be realized using a photonic integrated circuit (PIC) 40 in which a wideband quantum dot (QD) light source 42, photodetectors 30, 32, and the optical circuit can be integrated on a single chip. The PIC 40 uses on-chip couplers 44, 46, leading to reliability, size, weight, and power efficiency, and low cost.

In some embodiments, the on-chip couplers 44, 46 can be used to connect optical fibers with the PIC 40. A portion of the reference light path 18 can be replaced by a reference length optical fiber. The reference signal length is adjusted by reflection off the back of the reference collimator lens 26. The reference collimator lens 26 can be positioned up and down the range, and the down-range distance along the reference signal length is changed.

Figure 5:
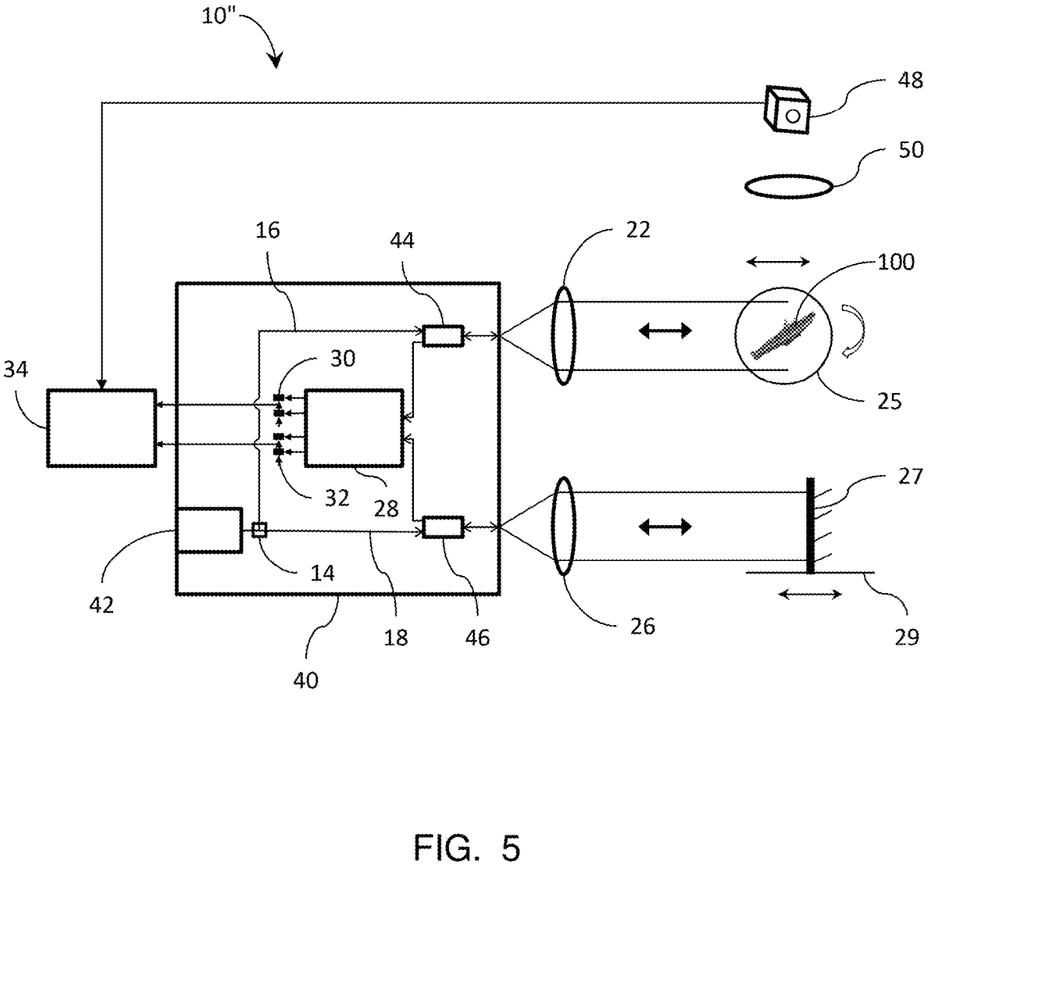
FIG. 5 provides a diagram of a device in combination with a focal plane array.

In another embodiment shown in FIG. 5, the RCS measurement range and light transceiver 10″ can be incorporated with a focal plane array image focused on the target for correlation with I-phase and Q-phase electrical output signals. The focal plane array system is used to assist synchronization of measurement for achieving improved RCS precision. As shown in FIG. 5, a focal plane array 48 obtains an optical image of the target 100 through an imaging lens 50. The target optical image from the focal plane array 48 is fed to the signal processor 34 in tandem with the RCS baseband information. This helps to synchronize the RCS baseband signal-processing algorithm and the position of the target 100. By integrating the target position in the analysis, averaging of the RCS/ISAR measurement outcome for all target positions over multiple angles and yaw leads to high-precision RCS/ISAR measurement.

A method of emulating radar cross-section measurement of an electromagnetic structure is also provided. A target 100 representing a scale model of the electromagnetic structure is mounted on a rotational stage 25. A light transceiver 10 shines a light signal into a target light path 16 onto the target 100, while the target 100 is rotated, and into a reference light path 18 onto a mirror 27. A reflected target signal having a Doppler shift in frequency is received from the target 100 and a reflected reference signal is received from the mirror 27. The reflected target signal and the reflected reference signal are combined into 90-degree phase separated optical signals, which are converted to electric signals. The electric signals are then processed into RCS measurements using a signal processor 34.

The present invention can be used to simulate the ISAR image in order to study the electromagnetic profile of a vehicle. A 3D image of the vehicle to be emulated is obtained and labeled. Such a 3D image may be created manually, by 3D optical imaging, by compiling many optical images taken from different angles or by rendering from drawings. Many techniques are known in the art. The 3D image of the vehicle is converted into instructions for a 3D printer, which is also known in the art. A model of the vehicle is printed at the appropriate scale for the analysis. The printing medium should be something that reflects NIR radiation. If the printing medium does not provide good NIR permittivity and permeability then the model can utilize polymer with metal oxide mixed in prior to printing. It is convenient to synthesize desired electromagnetic properties of the vehicle at the NIR light by mixing polymer resin and many different types of metal particles, such as gold (Au), or metal oxides, such as titanium oxide (TiO), etc. It is known to use nanocrystalline metal oxides as pigments in a coating to give superior NIR reflectivity. The printed model is dynamically imaged in near-IR, as described above. Multiple models can be printed for analysis at different frequencies and configurations. For example, 3D images of the vehicle can be altered to change the electromagnetic profile. The altered 3D images are converted into instructions for the 3D printer, which prints a model of the altered vehicle at the appropriate scale for analysis. Due to the extreme scaling, a large complex structure can be rapidly fabricated using nano-3D print with low cost.

As described above, the present invention uses a coherent optical I/Q demodulator to detect the optical domain target Doppler frequency shift, from which the target cross-range image is recovered by digital signal processing (DSP). Wideband optical noise with extremely short coherent length is used to determine the target down-range information. The wideband optical noise can be provided by an LED, a semiconductor amplifier, or an erbium doped optical amplifier. All are low cost optical sources. In some embodiments, the optical I/Q demodulator can be incorporated with an optical focal plane array image system to assist synchronization of RCS measurement with target position.

The invention has been described with references to specific embodiments. While particular values, relationships, materials, and steps have been set forth for purposes of describing concepts of the present disclosure, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain embodiments and modifications of the concept underlying the present disclosure, various other embodiments as well as potential variations and modifications of the embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

Finally, any numerical parameters set forth in the specification and attached claims are approximations (for example, by using the term "about") that may vary depending upon the desired properties sought to be obtained by the present disclosure. At the very least, and not as an attempt to limit the application of the doctrine of equivalents to the scope of the claims, each numerical parameter should at least be construed in light of the number of significant digits and by applying ordinary rounding.

What is claimed is:

1. A device for measuring electromagnetic properties of a target comprising:
   a stage capable of holding, rotating, and translating the target;
   a mirror that is capable of being laterally translated;
   a light source capable of providing a light signal wherein said light signal is white noise light in the near-IR frequency range;
   a splitter connected to said light source and having outputs capable of dividing the light signal into a target light path and a reference light path;
   a first collimator lens positioned to receive light from said splitter in the target light path, and further positioned to focus light from the target light path on said stage wherein reflected light is returned to said first collimator lens as a target reflected signal;
   a second collimator lens positioned to receive light from said splitter in the reference light path, and further positioned to focus light from the reference light path on said mirror wherein reflected light is returned to said second collimator lens as a reference reflected signal;
an optical coupler having a target input positioned to receive the target reflected signal from said first collimator lens and a reference input positioned to receive the reference reflected signal from said second collimator lens, said optical coupler having a combined optical output providing a combined optical signal from the target input and the reference input; and
a signal processor connected to said optical coupler and capable of determining electromagnetic properties of the target from the combined optical signal.

2. The apparatus of claim 1, wherein the target reflected signal includes a spatially dependent Doppler shift in frequency caused by rotating the target on said stage.

3. The apparatus of claim 1, wherein said optical coupler combines the reference reflected signal with the target reflected signal and decomposes the combined signal into two 90-degree phase separated signals for output as the combined optical output.

4. The apparatus of claim 1, wherein the combined optical signal has an in-phase output and a quadrature phase output.

5. The apparatus of claim 4, further comprising:
first photodetectors joined to receive the in-phase output from said optical coupler, said first photodetectors having an in-phase electrical signal output joined to said signal processor; and
second photodetectors joined to receive the quadrature phase output from said optical coupler, said second photodetectors having a quadrature phase electrical signal output joined to said signal processor.

6. The apparatus of claim 1, further comprising:
a focal plane array connected to said signal processor and positioned to obtain an optical image of the target on said stage wherein said signal processor correlates the optical image with the combined optical signal.

7. An apparatus for emulating radar cross-section measurement of an electromagnetic structure comprising:
a model of the electromagnetic structure;
a stage capable of rotating the model thereon;
a mirror capable of being laterally translated;
an optical noise signal source capable of providing an optical noise signal;
an optical power splitter connected to said optical noise signal source, said optical power splitter dividing the optical noise signal into a first path and a second path;
a first optical circulator having a first input, a first input-output, and a first output, said first optical circulator joined to said optical power splitter on the first path at the first input;
a first collimator lens joined to said first optical circulator at said first input-output, wherein the optical noise signal in the first path is collimated by said first collimator lens, shines on said model, and is reflected as a model reflected signal;
a second optical circulator having a second input, a second input-output, and a second output, said second optical circulator joined to said optical power splitter on the second path at the second input;
a second collimator lens joined to said second optical circulator at said second input-output, wherein the optical noise signal in the second path is collimated by said second collimator lens, shines on said mirror, and is reflected as a reference reflected signal;
an optical coupler having inputs connected to the first output of said first optical circulator and to the second output of said second optical circulator and having an optical coupler output, wherein said optical coupler is capable of combining the reference reflected signal with the model reflected signal and providing a combined optical signal at the optical coupler output; and
a signal processor connected to the optical coupler output and capable of determining an electromagnetic structure radar cross-section from the combined optical signal.

8. The apparatus of claim 7, wherein said optical noise signal is white noise light in the near-IR frequency range.

9. The apparatus of claim 7, wherein the model reflected signal includes a spatially dependent Doppler shift in frequency of the model reflected signal caused by rotating the model on said stage.

10. The apparatus of claim 7, wherein said optical coupler combines the reference reflected signal with the model reflected signal and decomposes the signals into two 90-degree phase separated signals for output.

11. The apparatus of claim 10, wherein the optical coupler provides in-phase output and quadrature phase output to said signal processor.

12. The apparatus of claim 11, further comprising:
first photodetectors joined to receive the in-phase output from said optical coupler, said first photodetectors having an in-phase electrical signal output joined to said signal processor; and
second photodetectors joined to receive the quadrature phase output from said optical coupler, said second photodetectors having a quadrature phase electrical signal output joined to said signal processor.

13. The apparatus of claim 7, further comprising:
a focal plane array connected to said signal processor and positioned to obtain an optical image of the model on said stage wherein said signal processor correlates the optical image with the combined optical signal.

14. A method of emulating radar cross-section measurement of an electromagnetic structure, the method comprising the steps of:
generating a model of the electromagnetic structure scaled to the differences between radar frequency and light frequency with sufficient precision to achieve 100,000 to 1 scaling;
positioning the model on a stage that is capable of rotating the model;
providing a white noise light source that is divided into a model path and a reference path;
collimating light on the model path;
shining collimated light on the model path on to the model;
rotating the model while shining collimated light on the model;
collimating light on the reference path;
shining collimated light on the reference path on to a mirror;
receiving a model reflected signal from the model and a reference reflected signal from the mirror;
combining the model reflected signal and the reference reflected signal into 90-degree phase separated optical signals;
converting the 90-degree phase separated optical signals to electrical signals; and
processing the electrical signals to give an emulated radar cross-section measurement of the electromagnetic structure.

15. The method of claim 14, wherein said light signal is in the near-IR frequency range.

16. The method of claim 14, further comprising the steps of:
  designating a range of interest for measurement of said model; and
  positioning the mirror in accordance with the designated range of interest to a position where said reference path is the same length as said model path.

17. The method of claim 16, wherein:
  designating a range of interest further comprises designating a plurality of ranges of interest including the range of interest to the nearest portion of the model and the range of interest to the farthest portion of the model;
  positioning the mirror comprises positioning the mirror at a plurality of positions in accordance with the plurality of ranges of interest; and
  performing the steps of combining, converting, and processing the signals to give emulated radar cross-section measurements at each of the plurality ranges of interest.

18. The method of claim 14, wherein the 90-degree phase separated optical signals include in-phase (I) output and quadrature phase (Q) output.

19. The method of claim 14, further comprising obtaining an optical image of the model and associating the optical image with the emulated radar cross-section measurement.

* * * * *